United States Patent [19]
Andrus

[11] Patent Number: 4,469,465
[45] Date of Patent: Sep. 4, 1984

[54] REBAR COUPLER

[76] Inventor: James S. Andrus, 947 N. Korff Dr., Vineland, N.J. 08360

[21] Appl. No.: 300,814

[22] Filed: Sep. 10, 1981

[51] Int. Cl.³ .............................................. F16B 7/18
[52] U.S. Cl. .................................. 403/282; 403/312; 403/313; 403/300; 24/20 LS; 29/463
[58] Field of Search ...................... 29/463, 526 R, 458; 24/249 R, 249 LS, 257, 243 B, 20 LS; 403/312, 313, 284, 282, 274; 52/726

[56] References Cited

U.S. PATENT DOCUMENTS

| | | | |
|---|---|---|---|
| 799,623 | 9/1905 | Augensen | 403/311 X |
| 907,539 | 12/1908 | Thomas | 403/312 |
| 3,551,999 | 6/1971 | Gutman | 403/274 X |
| 3,737,975 | 6/1973 | McKinnon, Jr. | 403/282 X |

*Primary Examiner*—Cornelius J. Husar
*Assistant Examiner*—Joseph A. Fischetti
*Attorney, Agent, or Firm*—Panitch, Schwarze, Jacobs & Nadel

[57] ABSTRACT

A rebar coupler for connecting reinforcing rods in end-to-end relation including a pair of hollow steel split pipe members having nuts welded thereto. The split pipe members are mounted on the ends of the reinforcing rods and bolted together. The split pipe members are annealed such that when bolted together the deformations on the outer surfaces of the rods embed themselves within the split pipe members to provide a very strong connection.

11 Claims, 3 Drawing Figures

REBAR COUPLER

BACKGROUND OF THE INVENTION

This invention relates to a coupling device for connecting two reinforcing bars in end to end alignment.

Reinforcing steel rods ("rebars") are universally used to strengthen concrete structures. In modern reinforced concrete construction, a large quantity of heavy reinforcing bars are utilized. Because of the large number of reinforcing bars which have to be assembled in end-to-end relationship, a great deal of time is involved in connecting reinforcing bars.

Rebars are produced in steel mills by rollers which size the diameter of the rods and also produce a predetermined form of deformation on the outer surface of the rods. These deformations provide the bonding strength of the rod to the concrete when the rod is embedded therein. The steel industry has developed standards for the strength of reinforcing steel rods, as well as standards for the nominal diameter and weight per linear foot for rebars. Each steel mill, however, has independently developed specifications for the spacing and orientation of the rebar deformations. The spacing and orientation of the deformations serve to indicate the source of the reinforcing rod. In some instances as a result of using various sets of rollers and as a result of the wearing of the rollers, even the same steel mill may have variations in both the spacing and orientation of the deformations, while at the same time maintaining the same deformation pattern and weight per linear foot.

It is also generally known that reinforcing steel rods are placed in a concrete structure in networks which are located at positions dictated by accepted design criteria. When the design criteria dictates that continuity of reinforcing steel is required, a number of methods have been developed to meet this criteria. One method involves merely the selection of reinforcing rods having the required length. The economics of production have, however, limited the total length of a single steel rod to approximately sixty feet. Another method is to lap splice two adjoining pieces of reinforcing steel rods. A lap splice, however, requires double the space than that required for a single bar and in areas of very dense reinforcing steel construction there is often not enought space available in relation to the concrete to meet design criteria. This is commonly encountered in columns, walls, piers or other structures that have a rather small volume, but require very heavy reinforcing steel rods. In addition, lap splicing is sometimes impractical because of the excessive length of the lap. In the case of the largest bars (#14 and #18) lap splicing is prohibited and mechanical splicing is recommended as an alternative.

In view of the above problems, connecting couplings have been developed to directly join two reinforceing steel rods in an end-to-end relation by a connecting means which effectively transfers the high compression and tensions loads which the rebar experience from one rod to another. Such couplings have taken the form of steel sleeves placed equal distances over both ends of the adjoining reinforcing rods. Molten metal is poured into the spaces defined between the outside of the reinforceing steel rods and the inside of the sleeve in order to bond the sleeve to the rod to form a mechanical splice. Obviously this method is cumbersome and sometimes cannot be relied on to provide the same strength in each coupling. It should be also noted that a fire hazard is always present whenever molten metal is employed.

Another connection method involves welding the rebars together. While welding would theoretically produce a connection between the rebars having a strength at least as great or greater than the individual bars themselves, under actual field conditions, welded joints often fall far below the strength of the individual reinforcing rods. Furthermore, welding is costly and time consuming. Because of the carbon content of the rebar, welding is often impractical.

Various types of mechanical couples have evolved as a substitute for the welded connection. One approach has been to form a cylindrical surface on the end of the rod by removing the ribs on the rebar and then threading the resulting surface. The threaded rebar is then joined by a connecting sleeve which is internally threaded. The disadvantage of this mechanical coupling is that the rebar must be reduced in diameter at the coupling section, often a very substantial reduction, to eliminate the ribs, which results in a loss in strength of the connection. A second approach to mechanical coupling is set forth in U.S. Pat. No. 3,415,552 in which a threaded tapered connecting section is formed at the end of the rebar. Since the connecting section tapers, the threads initially extend into the ribs of the rebar. As the section converges, into the central body of the rebar to pick up the full strength of the rebar, it is joined by a sleeve having oppositely facing, mating, tapered and threaded internal bores. A high strength mechanical connection with the tapered rebar connection of U.S. Pat. No. 3,415,552 can, however, only be repetively achieved if at least one of the rebar members in addition to the coupling sleeve is free to be rotated to take all of the slack out of the connection.

One typical example of a situation in which the reinforcing rods cannot be rotated is the formation of a tunnel in which curved reinforcing rods are used to reinforce a concrete shell inside the tunnel. When cylindrical threads are formed on each end of the curved reinforcing rods and a cylindrical sleeve is used, the sleeve may be rotated to pull the ends of the rebar into abutment without the necessity of rotating either of the curved reinforcing rods. This connection, however, will have a reduced strength by reason of the reduced diameter of the cylindrical threaded ends of the reinforcing rods. When the device of U.S. Pat. No. 3,415,552 is employed having tapered connecting sections on the rebar, it is not possible to effect a high strength connection simply by rotating the coupling sleeve. Since the connecting sections and the coupling sleeve are both tapered, the connection is made by rotating the sleeve only a few turns, for example, four to five rotations of the sleeve will achieve full connection. Unless the threads on each of the ends of the rebar and on each of the ends of the sleeves are in perfect alignment, however, rotation of the tapered rebar coupler sleeve will result in the coupler being rotated to a position which effects complete connection with one of the reinforcing rods before full connection is reached with the other rod. This condition is not tolerable since there is slack between the threads on the coupling sleeve and the tapered threads on the rebar, which will cause slippage at the connection upon loading of the concrete structure.

Another type of splicer commercially available for attaching adjacent reinforcing bars in end to end alignment for compressive loading of the bars consists of a sleeve having a generally C-shaped cross-section. A construction worker first slips the sleeve over an end of one of the bars and holds it in that position while an end of a second reinforcing bar is engaged into the sleeve to abut against the lower bar. The longitudinal edges of the sleeve diverge and the construction worker drives a tapered locking member into engagement with these edges to draw the edges together in wedge fashion about the reinforcing bars. This type of splicer requires considerable dexterity on the part of the construction worker, particularly when he is supported only on the steel-work. He must assemble the splicer by holding it firmly with one hand while he drives the locking member with a heavy mallet so that his hands are not free for supporting himself.

A variation of this type of splicer consists of an elongated member having a generally C-shaped cross-section. This member is adapted to engage snugly about a reinforcing bar and a plurality of curved straps are coupled to the elongated member by entering one end of each strap into a corresponding slot adjacent one edge of the member and attaching the other end of the strap by a bolt to the member adjacent the other longitudinal edge of the member. When the bolts are tightened, the elongated member and the straps are drawn against the reinforcing bars. One of the straps is used to attach the splicer to one of the reinforcing bars before entering a second reinforcing bar into the splicer. Once the second bar is in place the remaining bolts are tightened. This type of splicer has advantages over the previous type in that it can be assembled without the use of a mallet. The straps, however, tend to engage under the end of the second reinforcing bar as this bar is being engaged in the connector so that the construction worker must be careful to ensure proper registration of the second bar in the splicer. When the bars are upright there is a possibility that a strap may prevent the second or upper bar from entering the splicer so that the second bar may move sideways as it is being lowered into the splicer with resulting damage and possible danger to the worker.

The use of C-shaped cross-section couplers as described above are concerned with abutting rebars in a compressive situation, such as in the formation of columns. These couplers have little value in situations involving tension forces.

SUMMARY OF THE INVENTION

The rebar coupler of the present invention serves to connect the ends of two metallic, axially aligned and abutting, cylindrical reinforcing rods having pattern deformations on the outer surfaces of the rods. The coupler is comprised of two separable hollow members having inner cylindrical, initially generally smooth surfaces adaptable to fit around the periphery of the rods. These members are mounted on the ends of the rods. The inner surfaces of the hollow members are deformable such that when application of sufficient clamping force is applied on the members, the pattern deformations of the rods become embedded within the inner surfaces of the hollow members. Clamping means are provided to apply and maintain the clamping force and to hold the members in place around the rods.

BRIEF DESCRIPTION OF THE DRAWINGS

For the purpose of illustrating the invention, there is shown in the drawings a form which is presently preferred; it being understood, however, that this invention is not limited to the precise arrangements and instrumentalities shown.

DETAILED DESCRIPTION OF THE INVENTION

Figure 1:
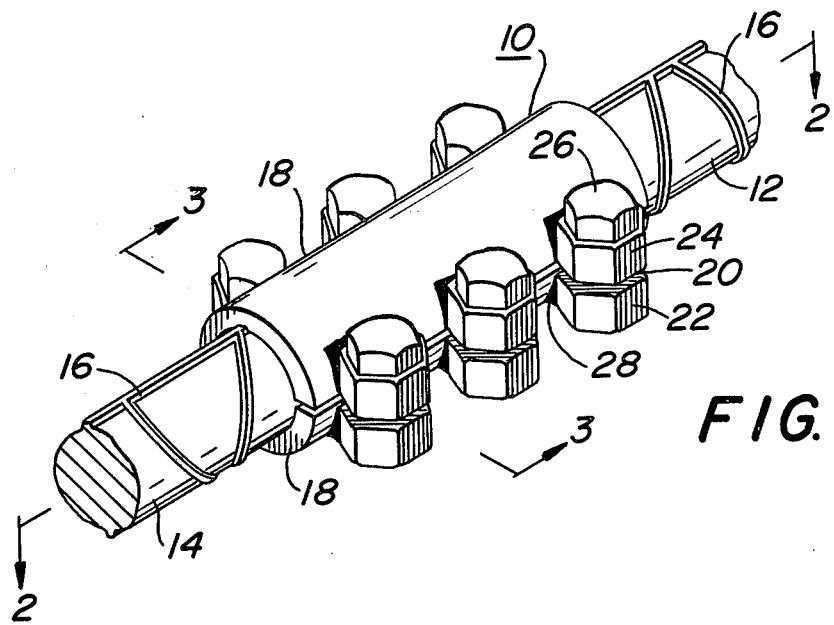
FIG. 1 is a perspective view of two reinforcing rods connected by a rebar coupling device according to the present invention.

Referring to the drawings, wherein like numerals indicate like elements, there is shown in FIG. 1 a rebar coupling device 10 according to the present invention. The rebar coupling device 10 connects axially aligned and abutting reinforcing rods 12 and 14. Each of the reinforcing rods 12 and 14 have a series of pattern deformations 16 on the outer surfaces thereof. The reinforcing rods 12 and 14 are generally fabricated from a strong metallic material such as steel.

The rebar coupling device 10 includes a pair of elongated hollow arcuate members 18 adopted to overlie and fit partially about the adjacent end portions of reinforcing rods 12 and 14. The hollow members 18 are typically metallic and are preferably fabricated from steel. The hollow members 18 may conveniently be produced by splitting a steel tube or pipe lengthwise.

The hollow members 18 are secured to the ends of the reinforcing rods 12 and 14 by compressing the hollow members 18 into intimate engagement with the reinforcing rods 12 and 14. The clamping means to hold the hollow members 18 around the reinforcing rods 12 and 14 include one or more nut-bolt assemblies 20. The nut-bolt assemblies 20 include a threaded internal nut 22 connected to the outer surface of one of the hollow members 18 by a weld 28 and a nut-like component 24 having the general structure of a nut but without internal screw threads (serves as a ring) connected to the outer surface of the other hollow member 18 by a weld 28 with a bolt 26 passing through component 24 and screw threaded into nut 22.

The nut 22 component 24 and bolts 26 are typically fabricated from steel such as ASTM A325, ASTM A490 or other high strength metal common to the construction industry. The number and size of the nut-bolt assemblies 20 will vary depending on the rebar diameter and length.

Figure 2:
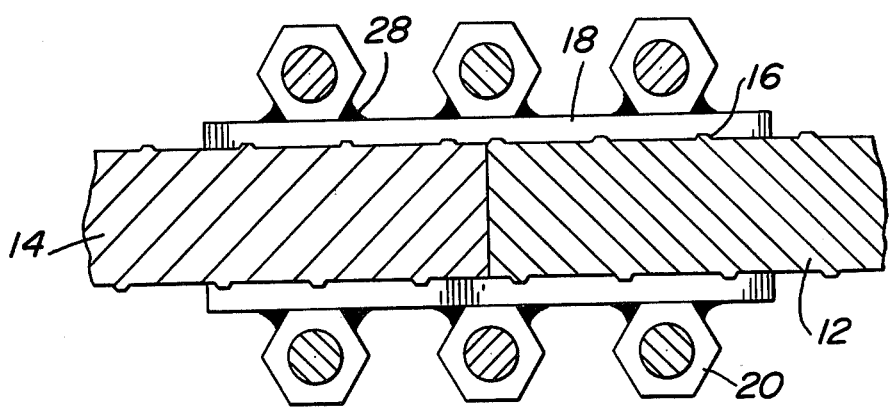
FIG. 2 is a bottom plan view in cross-section and taken along the plane of line 2—2 in FIG. 1.
Figure 3:
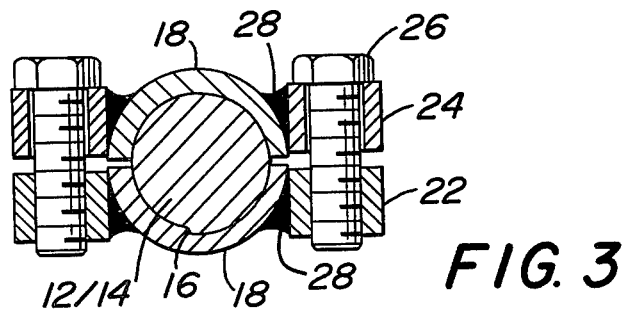
FIG. 3 is a plan end view in cross-section and taken along the plane of line 3—3 in FIG. 1.

Referring to FIGS. 2 and 3, it is clearly seen that the pattern deformations 16 embed themselves within the inner surfaces of the hollow members 18. This embedding of the deformations occurs because the hollow members 18 are somewhat softer than the reinforcing rods 12 and 14. This softening can be accomplished by annealing the hollow members 18.

In fabricating the coupling device 10, it is preferred that the nut 22 and component 24 are first welded to the hollow members 18 and the welded assembly then annealed. There is no need for the bolt 26 to be annealed. Furthermore, such annealing should occur before the hollow members 18 are clamped on the reinforcing rods 12 and 14.

The rebar coupler of the present invention has the following advantages:

(1) relatively easy to install and disassemble;
(2) relatively inexpensive to produce;
(3) provides a very strong bond between rebars;
(4) very little time required for installation;
(5) no welding is required at the job site; and
(6) the coupler does not require much additional space than that already occupied by the rebars.

The rebar coupler 10 of this invention can be easily installed. The two members 18 of the coupler 10 are placed over the area of the abutting, axially aligned rods 12 and 14. Bolts 26 are then screwed into place through the nut 22 and component 24. Impact wrenches which are commonly used on construction sites can be utilized to drive and tighten the bolts 26. The rebar coupler 10 can be easily disassembled for inspection by loosening the bolts 26. Such disassembling would not destroy the rebars 12 and 14 or detrimentally affect the bond formed when the coupler 10 is reinstalled after inspection. Since the rebar coupler according to this invention is installed by means of bolting, additional tradesmen are not required since such bolting can be done by the ironworkers at the construction site.

The present invention may be embodied in other specific forms without departing from the spirit or essential attributes thereof and, accordingly, reference should be made to the appended claims, rather than to the foregoing specification, as indicating the scope of the invention.

I claim:

1. A coupler for connecting the ends of two axially aligned and abutting reinforcing rods having pattern deformations on the outer surfaces thereof, said coupler comprising
two separable elongated members, the members each including at least an arcuate portion which portions cooperate to form a hollow cylinder when the two members are joined together, said members being adapted to be mounted around the abutting ends of the rods, said arcuate portions initially having generally smooth inner surfaces adaptable to fit about the periphery of said rods, said inner surfaces being deformable such that the application of sufficient clamping force on said members results in said pattern deformations of said rods being embedded within said inner surfaces of said arcuate portions of said members, and
clamping means on said members to apply and maintain said clamping force and to hold said members in place around said rods.

2. The coupler of claim 1 wherein said members are metallic.

3. The coupler of claim 2 wherein said members are annealed.

4. The coupler of claim 1 wherein said clamping means comprises at least one nut having internal screw threads, said nut being attached to one of said members, at least one ring attached to the other of said members with said ring aligned with said nut and at least one bolt passing through said ring and screw threaded to said nut.

5. The coupler of claim 4 wherein said ring is comprised of a component having the structure of a nut but having no internal screw threads.

6. The coupler of claim 4 wherein said members are metallic and said nut and said ring are each welded onto one of said members.

7. The coupler of claim 2 wherein said members are semicircular halfs of a pipe.

8. A method of coupling the ends of two axially aligned and abutting reinforcing rods having pattern deformations on the outer surfaces thereof comprising:
attaching at least one nut having internal screw threads onto a first member, the first member having an arcuate portion,
attaching at least one ring onto a second member, the second member having an arcuate portion, said arcuate portions of said first and second members cooperating to form a hollow cylinder having inner cylindrical, generally smooth surfaces adaptable to fit about the periphery of said rods, said ring positioned so as to be aligned with said nut,
mounting said first and second members around adjacent ends of said rods so that said arcuate portions engage said rods and
passing a screw threaded bolt through said ring and tightening said bolt onto said nut so as to apply sufficient clamping force to embed said pattern deformations of said rods within said inner surfaces of said arcuate portions of said members.

9. The method of claim 8 wherein said ring is a component having the structure of a nut but having no internal screw threads.

10. The method of claim 8 including making said first and second members by splitting a pipe lengthwise into two pieces.

11. The method of claim 8 wherein the first and second members are metallic and further comprising the step of annealing the members before mounting them on the rods.

* * * * *